Figure 1:
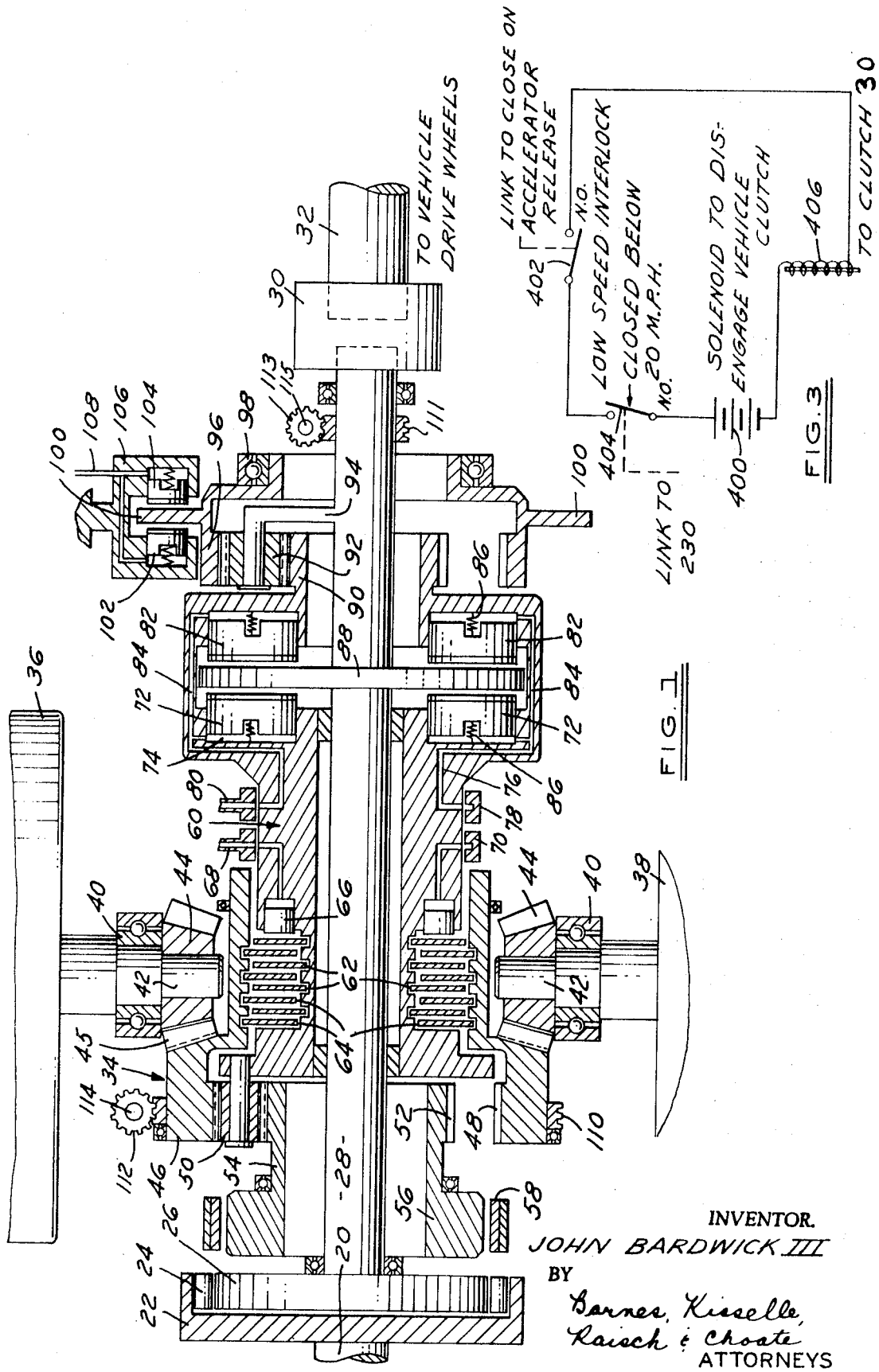

United States Patent
Bardwick, III

[11] 3,749,194
[45] July 31, 1973

[54] INERTIAL ENERGY SYSTEM FOR VEHICLES

[76] Inventor: John Bardwick, III, 1733 Westridge, Ann Arbor, Mich. 48105

[22] Filed: Mar. 19, 1971

[21] Appl. No.: 126,156

[52] U.S. Cl.................. 180/54 R, 74/751, 192/4 A
[51] Int. Cl............................................... B60k 1/10
[58] Field of Search................ 180/1 R, 54 R, 65 R; 74/751; 192/4 A

[56] References Cited
UNITED STATES PATENTS

| | | | |
|---|---|---|---|
| 2,118,590 | 5/1938 | Chilton | 74/751 X |
| 2,525,946 | 10/1950 | Roberts | 74/751 |
| 2,803,151 | 8/1957 | Clerk | 74/751 |
| 2,443,770 | 6/1948 | Kasschau | 180/65 R |
| 2,656,733 | 10/1953 | Dicke | 180/1 R X |
| 2,935,899 | 5/1960 | Nallinger | 180/1 R X |
| 3,493,066 | 2/1970 | Dooley | 180/54 R |

FOREIGN PATENTS OR APPLICATIONS 1,065,280  9/1959  Germany........................... 180/65 R Primary Examiner—Benjamin Hersh
Assistant Examiner—Milton L. Smith
Attorney—Barnes, Kisselle, Raisch & Choate

[57] ABSTRACT

An inertial flywheel system for vehicles including an automatic transmission which has clutch means for introducing energy to the flywheel from an engine or from a coasting or decelerating vehicle, and clutch means for transferring the stored energy to the vehicle on demand. A system of control is incorporated in the brake pedal and accelerator. The control system operates the clutches in a manner which allows stored energy to be utilized to supplement the power plant of the vehicle and allows the kinetic energy normally lost in braking to be transferred instead to the flywheel. The control system and transmission function together to insure efficient energy transfer, regulate the relation between flywheel speed and vehicle speed, modify performance of the system in response to grades, and transfer the braking function to the normal vehicle brake system when required.

12 Claims, 7 Drawing Figures

INVENTOR
JOHN BARDWICK III
BY
Barnes, Kisselle, Raisch & Choate

INERTIAL ENERGY SYSTEM FOR VEHICLES

Reference is made to my copending application, Ser. No. 96,460, filed Dec. 9, 1970, and entitled "Inertial Energy System for Vehicles."

This invention relates to an Inertial Energy System for Vehicles.

With the contemporary emphasis on ecology and environmental pollution, there is a desire to reduce the hydrocarbon, carbon monoxide, and other emissions from internal combustion engines used on the streets, roads, and highways. There is also a problem of fuel supply which may become more acute in the future and thus require a reduction in the consumption of hydrocarbon fuels. Coupled with these problems is the desirability of a vehicle which, for reasons of both safety and saleability, will have reasonable acceleration characteristics and good stability.

The present invention has for its object the provision of a powered vehicle which will couple a basic power unit with an inertial flywheel system in a manner that will permit storage of inertial energy at the least cost to the basic power unit, and to utilize this energy to provide supplemental power greater than that obtainable from the basic power unit when desired for acceleration from a stop or while passing another vehicle or under other unusual load conditions.

Thus, it is an object of the invention to increase the efficiency of a vehicle power unit whether it is an internal combustion engine, a battery powered unit, a fuel cell, or a turbine. The ultimate object is thus to reduce pollution by decreasing the need for a high power engine to achieve desirable acceleration and to decrease the need for operating any selected power unit under conditions which are least efficient from the point of view of fuel consumption or emission of pollutants.

A further object is to obviate the necessity for installing a basic power plant capable of driving a vehicle far in escess of any legal or sensible speed limit in order to obtain a desirable acceleration.

A still further object is the provision of a vehicle drive system which is highly useful for vehicles under conditions which demand a lot of starting and stopping such as city buses, delivery vehicles, mail trucks and the like. The present invention allows the stopping and the idling time to permit storage of inertial energy useful in acceleration for the numerous starts without overloading a fairly small capacity engine.

Another object is a vehicle transmission system which is essentially adapted to efficiently control flow of energy to and from an inertial system.

It is known that all moving vehicles have, associated with their motion, a kinetic energy equal to one-half their total mass times the square of the linear velocity plus an additional amount stored in rotating parts equal to one-half the moment of inertia times the square of the angular velocity. During the normal operation of present day vehicles this energy is supplied by the engine each time the vehicle accelerates, and the same amount of energy dissipated in the brakes, engine, or friction drag every time the vehicle stops or slows.

The present invention contemplates the storing of energy from the vehicle engine at various times during the operation of the vehicle when the engine can most efficiently produce energy. It also contemplates the storing of the kinetic energy lost by the vehicle itself during deceleration, thus recapturing for later use, some of the energy normally dissipated as heat during braking. This stored energy can then be used (at any rate desired) during subsequent acceleration of the vehicle.

The present invention also makes it possible to obtain desired acceleration without introducing excessive quantities of fuel into an engine which causes highest pollutant emission. Similarly, the absence of drag on the engine in deceleration avoids excessive fuel waste and undesirable emissions.

Another object of the invention is the provision of manual and automatic controls for the storage and release of energy at propitious times to effect the highest efficiency of the input from the basic power unit or vehicle and of the output from the flywheel.

A further object of the invention is the provision of a control system which can integrate with an automatic transmission of a vehicle in a manner to utilize the full advantages of the stored energy when it is desirable that it be fed into the system and to use constructively the kinetic energy of the vehicle to maintain the stored energy at a suitable level for efficient use.

It is still a further object to provide a transmission adapted to respond automatically to the normal controls of the vehicle such as the accelerator and the brake and also, in conjunction with a control system, to respond to the demands on the vehicle in a way to utilize the basic power plant in a most efficient way to avoid overload and consequent deleterious exhaust emission.

Other objects and features of the invention will be apparent in the following specification and claims wherein the principles of the invention are set forth together with the best mode presently contemplated for the practice of the invention.

Drawings accompany the disclosure and the various views thereof may be briefly described as:

FIG. 1, a sectional view of a transmission to be utilized with the control system.

Figure 2:
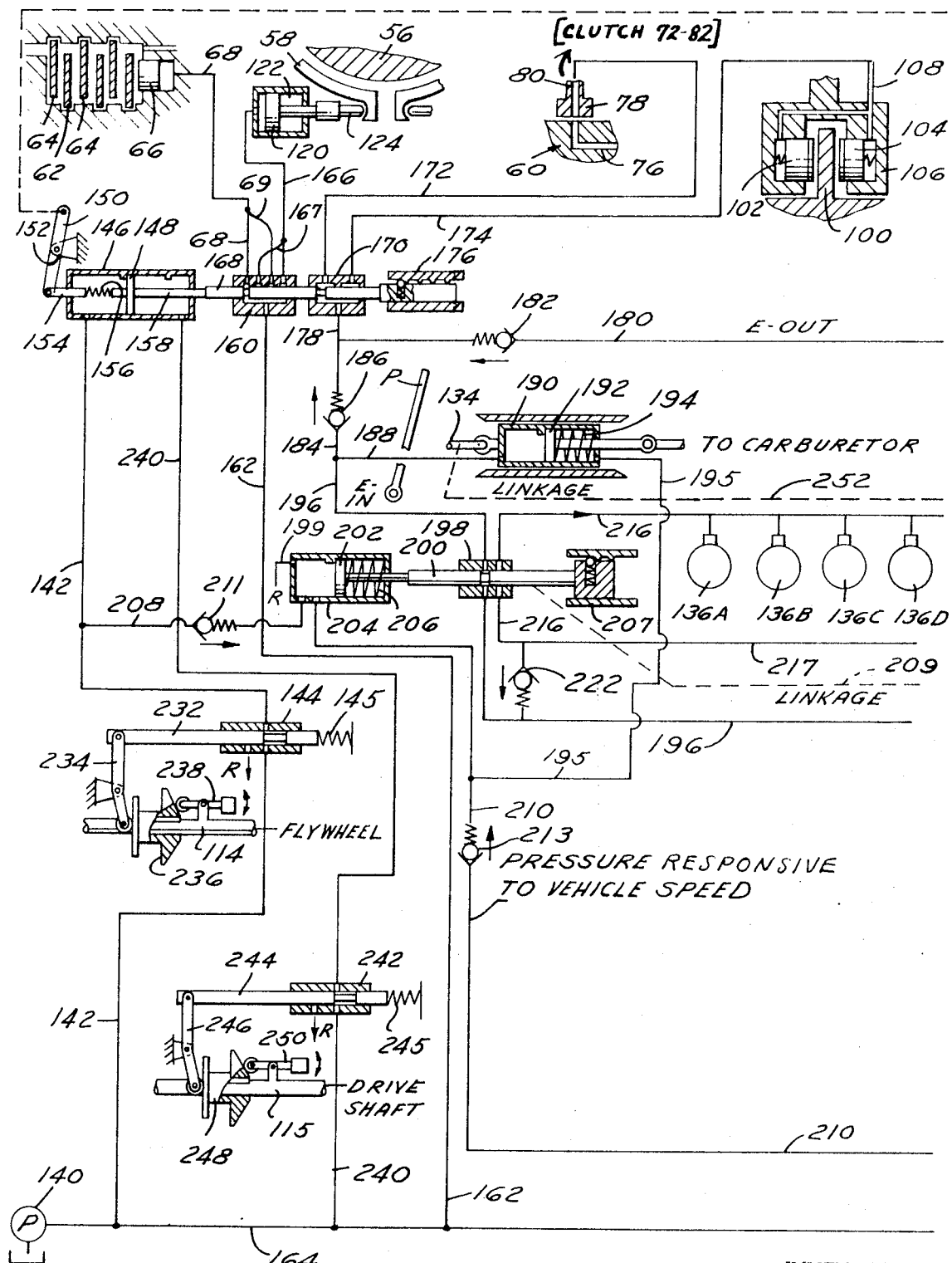
Figure 2A:
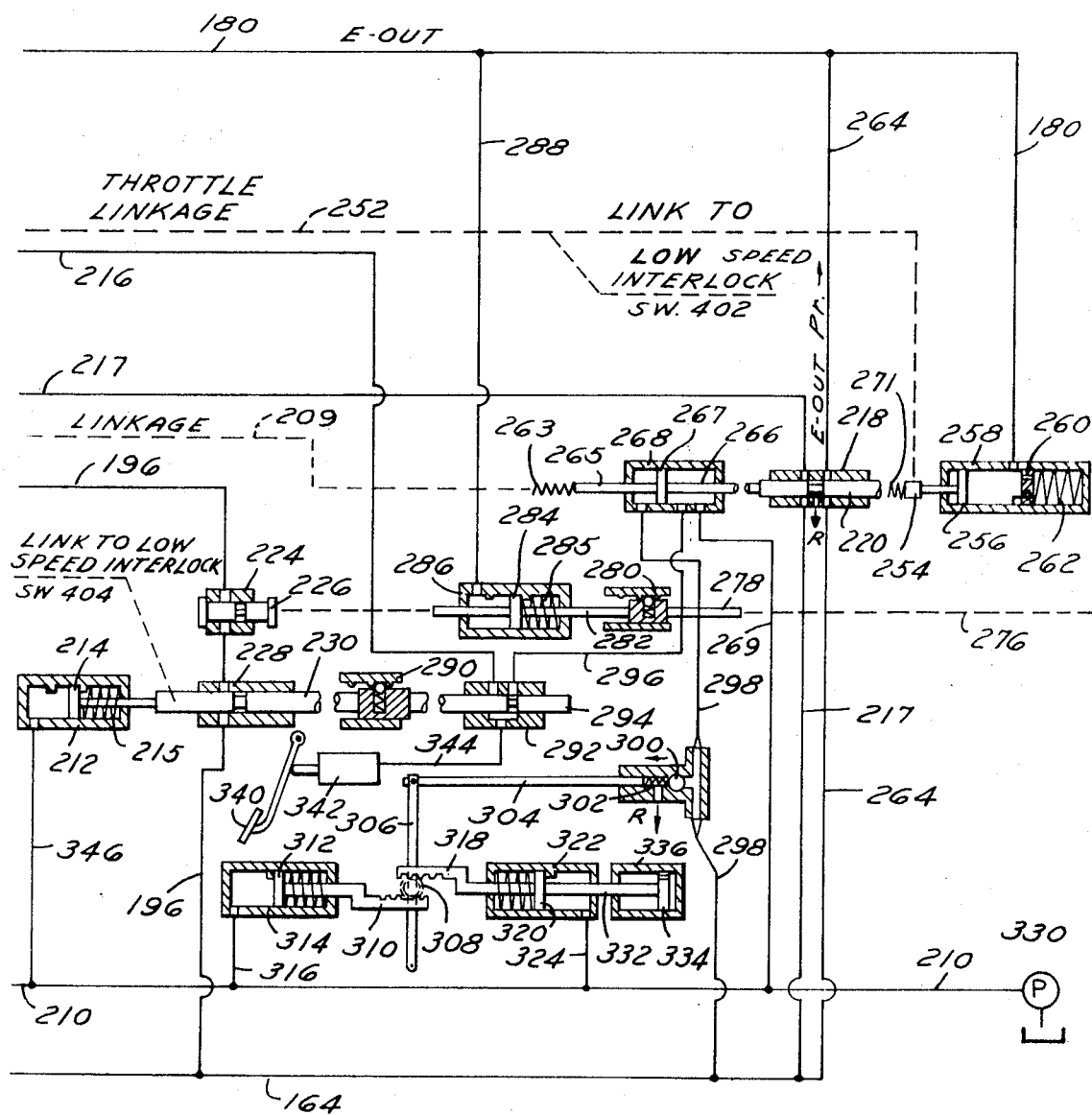

FIGS. 2 and 2A, a diagramatic presentation of a control system which is utilized with the transmission.

FIG. 3, a diagram of a clutch control circuit for a low speed interlock.

Figure 4:
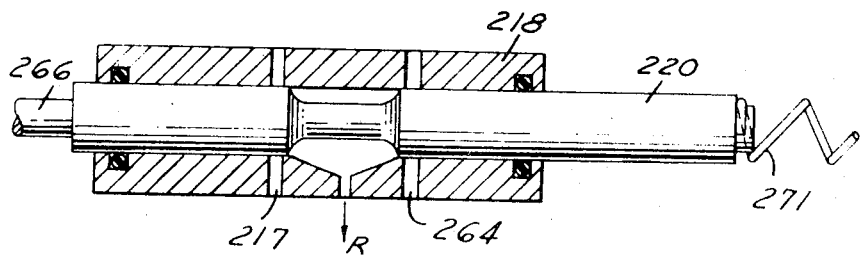

FIG. 4, a detail of a control valve of the system.

Figure 5:
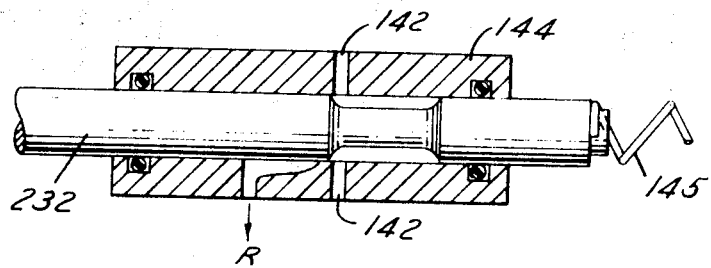

FIG. 5, a detail of another control valve of the system.

Figure 6:
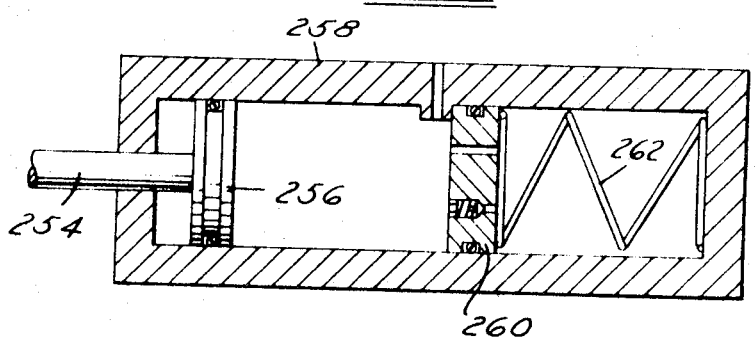

FIG. 6, a detail of a piston in a control cylinder.

Referring to the drawings:

TRANSMISSION STRUCTURE

An engine drive shaft 20 is connected to a housing 22 of a one-way roller clutch having rollers 24 and an output drive member 26 connected to a drive shaft 28. The drive shaft extends through a transmission to an element 30 which can either be a straight fluid coupling, a torque converter, or a centrifugally-operated friction clutch. Element 30 can be disengaged electrically by a control to be described. This element has its output at a drive shaft 32 which leads to the drive wheels.

Mounted around the drive shaft 28 is an assembly indicated generally at 34 with a suitable bearing relationship with the shaft or a supporting housing and mounted also on the vehicle frame, which is not shown, are one or more inertia wheels 36 and 38, the inner ends of which are supported on bearings 40 with a projecting shaft 42 which carries a bevel gear 44. The diameter and weight of these wheels can be readily determined by the nature and desired performance of the vehicle, the size of the prime mover, and the space available. These bevel gears 44 are meshed with a ring gear 45 on assembly 34 which also carries ring gear 46 which has internal teeth 48 cooperating with planetary gears 50 disposed around a sun gear 52. This sun gear is mounted on a rotating housing which has an axially extension 54 terminating in a friction drum 56 surrounded by a contractible control band 58 which is pressure operated, as will be later described, to engage the friction drum.

The planetary gears 50 are connected to a rotating housing 60 which has a series of inner clutch ring elements 62 interposed between outer clutch ring elements 64 on the assembly 34. The clutch elements are engaged by movement of an annular piston arrangement 66 actuated by pressure through a conduit 68 connected to a slip ring 70 surrounding the housing 60. At the right-hand end of the housing 60, as viewed in FIG. 1, is a circumferentially disposed piston arrangement 72 operating in a chamber 74 which receives pressure from a conduit 76 connected to a slip ring 78 supplied by a conduit 80. The housing also extends to include a similar piston arrangement 82 fed by a connecting conduit 84.

It will be seen that the clutch pistons 72-82 are restrained to the left and to the right respectively by tension springs 86 and these pistons lie on either side of a disc 88 which is connected to the shaft 28 so that pressure actuation of the pistons will cause a friction engagement of the disc 88. To the right of the friction piston clutch assembly 72-82 in FIG. 1, is a second planetary gear assembly surrounding a sun gear 90 which rotates with the assembly 60, the planetary gears 92 meshing with this sun gear and being mounted on arms 94 attached to the main drive shaft 28. An outer ring gear 96 meshes with the planetary gears 92, this being supported on suitable bearings 98 and having an outwardly extending friction flange 100 which is engaged by opposed pistons 102 and 104 circumferentially disposed around a stationary housing 106. The pistons are fed by a fluid passage 108 which is connected to the control system in a manner which will be later described. Also on the assembly 34 is a worm gear 110 which drives worm wheel 112 and a shaft 114, this motion being reflected in centrifugal control devices in the control system to be described. Similarly, on shaft 28 is a worm gear 111 which drives a worm wheel 113 and a shaft 115, this motion being reflected in a centrifugal control device to be described.

Thus, in this system, it will be seen that the engine shaft 20 is coupled through shaft 28 and element 30 to the vehicle drive shaft 32 and a one-way clutch 22 is interposed between shafts 20 and 28 allowing power to flow from the engine to the vehicle drive shaft but eliminating the braking function of the engine as a brake for the vehicle. The loss of this braking function of the engine is compensated for by feeding energy to the flywheels 36-38 at appropriate times when the vehicle is decelerating.

The flywheels are geared directly to the assembly 34 which always rotates at a speed proportional to the flywheel speed. When the disc clutch 62-64 is engaged and the friction band 58 is disengaged, the housing 60 will rotate at the same speed as assembly 34. When the disc clutch 62-64 is disengaged and friction band 58 is engaged, the housing 60 will rotate through the planetary set 50 at a speed 0.59 as fast as assembly 34. The band 58 and the clutch system 62-64 are meant to be operated either fully engaged or fully disengaged and it is not intended that there be slippage here while power is being transmitted. Accordingly, wear on the components of these friction systems should be comparable to that experienced in similar bands and multiple disc clutches uti-lized in automatic transmissions in common use at the present time.

The assembly 60 is coupled directly to the drive shaft 28 by the piston assembly 72-82 acting on the friction disc 88 when the disc 100 is disengaged. The piston set 102-104, when pressurized, connects the rotating assembly 60 and the drive shaft through the planetary set 90-92; and with this arrangement shown, a further speed reduction of 0.35 takes place. Thus, with suitable gearing the speed of the drive shaft can be related to the speed of the assembly 34 as indicated in the following table:

| (Ratio) Speed of drive shaft Speed of assembly 34 | Band 58 | Clutch 62-64 | Clutch 72-82 | Clutch 102-104 |
| --- | --- | --- | --- | --- |
| 1.0 | | engaged | engaged | |
| 0.59 | engaged | | engaged | |
| 0.35 | | engaged | | engaged |
| 0.21 | engaged | | | engaged |

The mechanism above is made to function as a variable ratio device, with the ratio ranging continuously from 1 to 0 by allowing slippage to occur in the assemblies actuated by clutches 72-82 and 102-104. If a friction clutch is chosen for element 30, the energy dissipated in this slippage will be comparable to that normally lost in a single wheel brake; the design of the frictional components of these assemblies 72-82 and 102-104 should be planned accordingly. When element 30 is a fluid coupling, the wear on assemblies 72-82 and 102-104 will be less.

With the above arrangement, the fluid pressure to operate the band 58 and the disc clutch 62-64 will be either "on" or "off" with no requirement for intermediate pressures. On the other hand, the hydraulic pressure to operate the other clutches is variable, the pressure being set by the performance required of the vehicle.

The transmission has been described for forward movement only to simplify the disclosure. It will be appreciated that a reverse system will be incorporated into the transmission in accordance with usual practice in present day automatic transmissions.

It should also be emphasized that, for the vehicle to be driven, no additional transmission is required. Since the flywheel is inherently capable of supplying energy at any rate desired, the normal function of an ordinary transmission is not required. The purpose of the transmission described above is to insure efficient energy transfer, thus minimizing the weight of the flywheel and the energy lost in frictional coupling. All that is required of the vehicle engine is that it supply sufficient power to overcome frictional losses; the energy required for vehicle acceleration is supplied by the flywheel.

CONTROL ELEMENTS AND CIRCUIT

Referring to FIGS. 2 and 2A, which are a composite of a control system for the variable speed transmission, reference is first made to the elements in these figures which have been described in connection with FIG. 1. In the upper portion of FIG. 2 is found the clutch 62-64 controlled by the conduit 68, and the contractible band 58 for controlling the friction drum 56, this band being actuated by a piston cylinder arrangement 120–122 with a projection plunger 124. Also, in this area of FIG. 2 is the slip ring 78 supplied by the conduit 80 for carrying fluid to the passages 76 and 84 leading to the pistons adjacent to the clutch disc 88. The conduit 80 is fed directly by fluid from a line 172 to be later described. Similarly, the pistons 102 and 104 for controlling friction flange 100 are fed through a conduit 108 from a line 174 to be later described.

In these drawings, in FIG. 2, there is shown an accelerator pedal P which will operate on linkage 134. The four wheel brake mechanisms are also shown diagrammatically at 136A, 136B, 136C and 136D. At the lower left-hand corner of FIG. 2 is shown a pump 140 which can be referred to as a front pump having a constant pressure driven by the engine of a vehicle. This pump delivers pressure through a conduit 142 and a valve 144 to one end of a cylinder 146 carrying a piston 148. The piston 148 is also controlled at the left-hand end by a linkage bar 150 pivoted at 152 and connected to an input push rod 154 bearing, through a spring 156, on the piston rod 158. The output of the piston rod 158 is connected to a valve 160 which operated to control pressure from a line 162 which also is connected to the output of pump 140 through a conduit 164.

The valve 160 which has four positions will transmit pressure in a first and third position to the passage 68 or 69 leading to clutch 62–64 and, in a second or fourth position, to the band piston 120 through a conduit 166 or branch passage 167. The valve rod 168 which functions in the valve 160 also continues to a valve 170 for directing pressure to a conduit 172 or a conduit 174 leading respectively to clutch control lines 80 and 108. The end of the valve rod 168 is controlled at a multiple detent unit 176 for four definite stop positions in its path of travel. The valve housing 170 connects to a conduit 178 leading to a conduit 180 through a check valve 182 and leading also to a conduit 184 through a check valve 186. The conduit 184 branches to a conduit 188 leading to a cylinder 190 associated with throttle linkage 134, this cylinder having a piston 192 backed by a spring 194. The conduit 184 also leads to a conduit 196 which connects to a valve housing 198 controlled by a valve rod 200, this valve rod being actuated by a piston 202 in a cylinder 204 against a spring 206. The left end of cylinder 204 has a small orifice 199, which allows pressure in cylinder 204 to be relieved, in a suitable time, by returning fluid to the sump R. Valve rod 200 is also connected through linkage 209 and spring 263 to valve rod 265 in cylinder 268, to be described later. The valve rod 200 is conntrolled in either of two positions by a detent assembly 207.

The left-hand end of cylinder 204 is connected through a conduit 208 and check valve 211 to the original pump conduit 142, the pressure in which is controlled as will be described, and it is also connected through a conduit 210 and check valve 213 to a second pressure source 330 which is proportional to vehicle speed (FIG. 2A). Conduit 210 also is connected, through line 195, to the right end of cylinder 190. A cylinder 212 with a piston 214 backed by spring 215 is also connected to conduit 210. The valve rod 200 from piston 202 controls a brake line conduit 216 which is connected the wheel cylinders 136A, 136B, 136C, and 136D. This conduit 216 extends on the other side of valve 198 in a line 217 which leads to a valve 218 in FIG. 2A controlled by a valve rod 220. Conduit 217 connects to basic pressure line 164 and is also connected through a check valve 222 to line 196 which leads to a valve body 224 controlled by a valve rod 226 in FIG. 2A, and it will be seen that the line 196 continues through a valve body 228 controlled by a valve rod 230 until it connects again to line 164 from the basic pump supply 140.

In the position shown, valve 198 allows pressure to be transmitted wherein prime mover or vehicle energy is supplied to the flywheel. If the vehicle is stopped, the valve will remain open until the flywheel reaches maximum rated speed. If the vehicle is moving, the energy supply to the wheel will be interrupted when the speed of the wheel is less than maximum rated speed. When the vehicle is in motion, the energy needed in the flywheel for further acceleration is decreased and also it is important that the flywheel have a storage capacity for slowing the vehicle when desired. Thus, the vehcile speed and flywheel angular velocity will be related in a predetermined manner so that the maximum angular velocity of the flywheel decreases as the vehicle speed increases. As an example, the relation 37 (vehicle speed)$^2$ + (flywheel angular velocity)$^2$ = constant" could be used, and these relationships can be accomplished with careful attention to the control pressure which is responsive to flywheel speed and regulated by valve 144 and the output of pump 330. Suitable calibration of valve 144, the centrifugal control 236, and pump 330 will achieve this result.

Returning to FIG. 2, the valve body 144, detailed in FIG. 5, is controlled by a valve rod 232 which is influenced in its position by a lever 234 controlled by the position of a sensor element 236 movable on the shaft 114 which is driven by the worm gear 110 shown in FIG. 1 on the outside of ring gear 46 of assembly 34. The centrifugal element 238 will influence the position of the sensor 236. A similar arrangement is shown wherein a conduit 240 leading from the pump 140 and line 164 passes through a valve housing 242, identical to valve 144 detailed in FIG. 5, and on upwardly to the right-hand end of cylinder 146. In the valve body 242 is a valve rod 244 controlled by a lever arm 246 influenced by sensor 248 and a centrifugal element 250 driven by a worm gear 111, a gear 113 and a shaft 115 responsive to rotation of drive shaft 28.

With more detailed reference to FIG. 2A, it will be seen that there is a throttle connection 252 shown in dotted lines from the accelerator linkage 134 to a control element 254 connected through a spring 271 to the valve rod 220 in valve body 218. The element 254 is connected through a piston rod to a piston 256 in a cylinder 258 having a connection to line 180. A reaction plunger 260, detailed in FIG. 6, backed by a spring 262, is provided in this cylinder to absorb and sustain rapid accelerator action. This plunger 260 has a small equalizing orifice through it and also a check valve which permits free flow from right to left. It will be seen that the valve body 218 with the rod 220 controls a line 264 which leads from line 180 down to basic pressure line 164. It also controls line 217 which leads from cylinder 198 to line 164. The rod 220 extends to connect to a piston rod 266 on piston 267 in a cylinder 268. The right-hand end of cylinder 268 is connected by a line 269 to proportional pump line 210.

A second mechanical linkage 276 extends from the lever arm 150 in FIG. 2 to a rod 278 controlled by a detent assembly 280 and leading to a rod 282 connected to a piston 284 backed by a spring 285 in a cylinder 286, which can be designated the E-In - E-Out cylinder, i.e., it controls whether energy will be fed from the engine or vehicle into the flywheel or from the flywheel out. This cylinder is connected through a conduit 288 to the previously referenced conduit 180. The piston rod 282 is connected also to the valve rod 226.

It will be seen that the valve rod 230, controlled by the spring-backed piston 214, is similarly regulated by a detent assembly 290, the rod 230 extending to a valve body 292 controlled by the valve end 294 of the rod 230. This valve leads to the brake-line conduit 216 and alternatively to a conduit 296 (braking pressure) leading to the right-hand end of cylinder 268. This cylinder 268 is also connected at its left end to a conduit 298 leading from the pressure supply passage 164 of the basic pump supply. A by-pass valve 300 exposed to the passage 298 is backed by a spring 302 which in turn is backed by a rod 304 controlled by a lever 306. The opening of valve 300 connects line 298 to a return vent R. On this lever is a spur gear 308 which is engaged with a rack 310 at the bottom controlled by a spring-backed piston 312 in cylinder 314 exposed to pressure in proportional pressure line 210 through a branch line 316.

A second rack 318 on the top of the spur gear is controlled by a spring-backed piston 320 in cylinder 322, the right-hand end of which is exposed through a connector line 324 to proportional pressure line 210 originating at a pump 330, which produces pressure proportional to vehicle speed. This pump can be connected to the output drive shaft of the vehicle in a manner to have its output proportioned to the speed of the vehicle. A rod 332 extending from the piston 320 also carries a damper piston 334 in a cylinder 336, this piston having a small orifice extending through it to serve as a damping control.

Also, in FIG. 2A is a brake pedal 340 which acts on a master cylinder 342 leading to connector line 344 which opens to the valve housing 292. It will be seen that the line 210 is connected to the left-hand end of cylinder 212 through a connector line 346. In FIG. 3, an electrical circuit, which receives energy from a battery or generator 400, is controlled by a switch 402 mechanically linked to the accelerator or linkage 252, and by a switch 404 linked to valve rod 230. A solenoid 406 is actuated, when these normally open switches are closed mechanically, to disengage the vehicle clutch 30 when the vehicle speed is below a certain rate such as 20 miles per hour and the accelerator is released.

OPERATION

The object of the entire system above described is to provide not only a variable speed transmission but also to provide an inertial storage system which can store up high kinetic energy, under conditions when the engine is not loaded, or when the vehicle is in a position to impart its energy into the storage system. This stored energy can be used for acceleration so that the engine is not overloaded, and the storage system may also be used to supplement the braking system when the vehicle is being decelerated.

Since the operator is using only the accelerator and brake as normal controls for the vehicle, the control elements and circuit must be responsive to vehicle speed and acceleration and also to conditions of up grade or down grade as reflected in the prime mover, in this instance, an internal combustion engine. The general control system can also be used with a battery-motor combination, turbine engine, etc. with appropriate sensor devices.

Energy in to Flywheel (E-In)

With reference first to the valve 144 in FIG. 2, it has been noted that this is controlled by the speed of the shaft 114 which is related to the speed of the assembly 34 in FIG. 1 through the worm gear 110 and the worm wheel 112. This motion is resisted by a compression spring 145. This reduces the unregulated pressure from the basic pump 140 to a pressure which is directly proportional to the speed of the assembly 34, and, accordingly, the speed of the flywheels 36–38. The details of valve 144 are shown in FIG. 5, where it will be seen that pressure from line 142 is by-passed to a return line R in a volume dependent on the position of the valve. This regulated pressure is then supplied to one end of the control valve cylinder 146 and, through check valve 211, to the regulator cylinder 204.

When the shaft 114 driven from the ring gear 45 is rotating at a low speed, the centrifugal force on the element 238 is small and the compression spring 145 will force the valve rod 232 to the left. With the valve in the extreme left position, hydraulic fluid from pump 140 is mostly by-passed back to the sump indicated at R. As the speed of the shaft increases, the rod 232 will be moved to the right and this gradually closes the by-pass opening and results in an increased pressure in the line 142 leading to cylinder 146.

A similar mechanism has been described in connection with valve 242 (identical to valve 144 detailed in FIG. 5) except that the shaft 115 for the centrifugal sensor 248 is driven from drive shaft 28 through the worm gear 111. Here again, at low speed, the compression spring 245 will hold the valve to the left and cause pressure return to the sump outlet R. As the speed increases, of course, the output will be passed through the conduit 240 to the right-hand end of the control piston 146. The regulator valve 198 is also associated with the line 142 through the connecting line 208 and the piston 202. Pressure will reach the cylinder 204 from 142 again in proportion to the speed of the flywheels and will also reach this cylinder through a conduit 210 from the so-called proportional pump 330 which operates in response to vehicle speed.

Thus, the function of this cylinder 204 is to set a maximum speed for the flywheel that decreases as the speed of the vehicle increases. Thus, pressure through the valve 198 will reflect at 196 and 178 leading to the valve 170. Likewise, a high pressure output from pump 330 in response to vehicle speed will place a high pressure in cylinder 204 to shift valve 200 to block pressure from lines 196 and 178.

If the system is attempting to feed energy from the engine to the flywheel, in other words, the flywheel is not at maximum speed, which will be indicated by pressure in the E-In (Energy-In) line 196, the throttle link 190, by pressure through line 188, will further open the throttle by moving piston 192 to allow this energy transfer to occur without disturbing the existing relation between the accelerator position and the road horsepower. The extent of throttle opening actually realized will depend also on the pressure in the left end of cylinder 204 (through lines 210 and 195). Thus, if a large input to the flywheel is required, the pressure in the left end of cylinder 204 will be small, and this pressure, transmitted through lines 210 and 195, to cylinder 190 will allow a large increase in throttle setting to occur.

Reference is now made to the four-position control valve 160 controlled by the piston 148 previously referenced. To recapitulate to some extent, the input to the left-hand side of the cylinder 146 is proportional to the flywheel speed. The input to the right-hand side of the cylinder is proportional to the drive shaft speed, and the mechanical linkage 276 from the rod 278 is a third input, this being through the spring 156. The combined control valves 160 and 170 supply unregulated pressure to lock band 58 or the clutch 62–64, and they supply regulated pressure from the E-In line 196 and the E-Out line 180 to pressurize the clutch assemblies 72–82 or 102–104.

If we assume that the mechanical linkage from the rod 278 leading to the lever arm 150 is set for E-In, as caused by spring pressure 285, that is, energy is to be transmitted from the vehicle engine to the flywheel, and the flywheel is at minimum speed with the drive shaft 28 turning, the lack of pressure in the left-hand portion of cylinder 146, the tension in the spring 156, and the pressure proportional to the drive shaft speed in the right-hand end of the cylinder 146 all contribute to hold the valve 168 in the farthest left position as illustrated in FIG. 2. This causes actuation of the disc-clutch 62–64 and the clutch 72–82 through lines 68 and 172 respectively.

Energy is then fed to the flywheel until the ratio between the speed of the drive shaft 28 and the speed of the assembly 34 reaches 1.0. At this point energy transfer from the drive shaft to the flywheel would normally cease. However, the increased speed of the assembly 34 causes additional pressure from the regulator 144 to be fed to the left-hand end of cylinder 146. This additional pressure is just sufficient to cause the valve rod 168 to move one notch to the right as controlled by the detent assembly 176. This will actuate band 58 and the clutch assembly 72–82 through branch line 167 and line 172, respectively. Energy is again fed to the flywheel until the ratio between the drive shaft speed and the flywheel speed approaches 0.59.

Again, the increased pressure in the left-hand portion of cylinder 146 shifts the valve another increment to the right allowing actuation of the clutch 62–64 and the clutch 102–104 through lines 69 and 174, respectively, and energy is fed to the flywheel until the ratio between the drive shaft speed and the flywheel speed approaches 0.35. In the same manner as before, the valve 160 is shifted to the last notch to the right and the flywheel becomes fully energized by the actuation of the band 58 and clutch 102–104 through lines 166 and 174 respectively, with the final ratio of drive shaft speed to assembly 34 speed equaling 0.21.

In the present system, the speed of the flywheel varies from maximum rated speed down to about half that value while shaft 28, in line with current automotive practice, will have a speed range of about 1 to 4. Thus, coupling between assembly 46 and drive shaft 28 must cover a range of relative speeds of 8:1. The ratios chosen (1.0, 0.59, 0.35, 0.21) result in the overall efficiency of above 75 percent, enough to make the entire assembly practical. It will be appreciated that higher efficiencies can be obtained by increasing the number of gear ratios used or by further limiting the range of speed in which the flywheel operates.

As an example, we could allow the flywheel to operate only between 90 percent and 100 percent of maximum rated speed. Coupling between assembly 46 and the drive shaft 28 would then occur over a speed range of about 4.5 to 1 (instead of 8:1 as above) and a 4 speed coupling assembly with ratios 1.0, 0.69, 0.47, and 0.33 would yield an efficiency of about 84 percent. It is also readily apparent that the number of ratios in the coupling assembly can be reduced. A simpler mechanism than that shown in FIG. 1 would result if assembly 34 were attached directly to assembly 60 eliminating band 58 and disc clutch 62–64. The coupling mechanism is now a two-speed device. If we choose a ratio of 0.35 for the planetary set 90–92, the overall efficiency will be about 60 percent.

The choice of the number of ratios in the coupling device and speed range of the flywheel thus will depend on matters such as manufacturing costs, space and weight limitations of the particular vehicle, range of engine and drive shaft speeds, etc.

It will be appreciated that in the above-described sequencing, the control valve 160 and its companion valve 170 move progressively to the right as the speed of the flywheel increases and the clamping of the described combinations of band 58 and the respective clutches causes energy to be fed to the flywheel.

Energy Out of Flywheel (E-Out)

The kinetic energy in the flywheel system can be utilized in starting the vehicle and the accelerating at any time in the normal speed range.

If vehicle speed is nil and flywheel speed as at maximum rated speed, the pressure in cylinder 204 will be high enough through line 208 to move valve 198 to the right-hand position closing line 196 and opening line 216 which will allow the brake system to be actuated, if required. Pressure from pump 140 is available to E-Out line 180 through lines 164 and 264 and valve 218. Depression of the accelerator will accelerate the engine but also, through linkage 252, and element 254, move piston 256 to the right and put pressure in E-Out line 180. This pressure will first cause valve 284 to shift to the right-hand (E-Out) position setting valve rod 168 (through 282, 278, 276, 150, 154, 156, 158) for E-out and second will pressurize either line 172 or 174 through valve 170, actuating one of the clutches 72–82 or 102–104 to cause the flywheel to drive shaft 28. This immediate response, which will soon diminish by reason of the reaction piston 260 (see FIG. 6 for detail, is replaced by a second response controlled by valve rod 220. This valve rod is connected to piston 267 in cylinder 268, and the left side of piston 267 is also connected to linkage 209 by rod 265 and spring 263. Rod 220 is also connected by spring 271 to the element 254.

Under normal circumstances, while accelerating, the valve rod 220 is held to the right of center by tension in the spring 271, partially closing off the return line R and effecting pressure build-up in line 264 leading to line 180 which sustains the energy-out condition at valve 170. The E-Out pressure is variable depending on the position of valve rod 220; thus a large accelerator movement will pull rod 220 (through spring 271) far to the right further closing off the return R giving rise to a large E-Out pressure in lines 264 and 180.

As the vehicle approaches desired cruising speed, the combination of decreased tension from spring 271 by release of the accelerator and increased pressure in velocity porortional line 269 will cause valve rod 220 to return to mid-position closing off line 264. At this stage, the engine alone will drive the vehicle. If speed-up is desired, the same sequence will occur.

Piston 267 is also influenced by a pressure in line 298. This line will be pressurized in proportion to the acceleration of the vehicle and thus will tend to prevent use of flywheel energy on up grades or when driving against strong head winds. This is accomplished through the by-pass valve 300 and the piston-cylinder combinations 312–314 and 320–322. These spring resisted pistons, which are exposed to proportional pump 330 (vehicle speed), act on lever 306 through racks 310 and 318 and gear 308. At constant vehicle speed, the position of pistons 312 and 320 will be the same so lever 306 does not move. If the vehicle is accelerated, the pressure response in cylinder 314 and 322 is the same but piston 320 is influenced by a damper piston 334 in cylinder 336 and thus tends to lag in motion causing arm 306 to change spring pressure 302 on the pressure relief valve. This will produce a pressure rise in line 298 proportional to vehicle acceleration.

To reiterate, the E-Out, E-In valve 220 is normally influenced by acceleration of the vehicle, velocity of the vehicle, and throttle position. Where oridnarily depression of the accelerator will cause pressurizing of line 180 and subseqnetly line 264 to effect E-Out condition, if the vehicle is on an up grade, there will be a lack of pressure in the left-hand end of piston 268 through line 298 and thus the flywheel energy is not normally used. Thus, for a given accelerator position, the vehicle travels more slowly up hill.

Operation down hill is similar. If the accelerator is set at a position which would result in a speed of 50 miles per hour on level ground, then, on reaching a down grade, the vehicle would accelerate causing increased pressure in line 298 allowing the flywheel energy to assist the acceleration. However, there would be no sustained E-Out condition since, as the vehicle velocity increases, pressure in line 269 would return valve 220 to the mid-position shutting off the E-Out signal to line 264.

It will be appreciated that when it is desirable to feed energy from the flywheel to the drive shaft as above described, after the flywheel has reached a suitable speed, the mechanism will operate to shift the valves 160–170 one notch to the left which is accomplished by increasing the tension on the spring 156 as a result of the linkage connection 276 controlled by the piston 284. with the spring support set in the E-Out position, that is, energy out of the flywheel into the vehicle, the valve 160–170 will move progressively to the left as the flywheel slows down, always setting a ratio between assembly 34 and drive shaft 28 speeds that will allow transfer at the greatest possible efficiency. In other words, the position of the spring support 154 at cylinder 146 determines whether the energy is fed to or from the flywheel and this is controlled by the two position piston-cylinder combination 284–286. Spring 285 normally moves piston 284 to the left to the E-In position. Pressure in line 288 from line 180 moves piston 284 to the right to the E-Out position which, through linkage 276 affects spring 156 to move valves 168–170. Careful attention to the pressure required to operate piston 284 will insure that piston 284 and valves 168–170 shift to the E-Out position prior to actuation of clutches 72–82 or 102–104.

Braking

The automatic system is tied into the braking system of the vehicle in a manner to utilize the advantages of the inertial system.

First, if the car is cruising with the usual proportional wind-up of the flywheels, then when brakes are applied through foot pedal 340 and master cylinder 342, pressure will move through line 344 and valve 294 to line 296 and into cylinder 268. This moves piston 267 and valve 220 to the left allowing pressure from 164 and 217 to reach valve 198, which in its right-hand position (because of flywheel and vehicle speed) will pass fluid to the brake cylinders. After a predetermined slowing, the valve rod 200 will move to the left because of reduced pressure at line 210, thus pressurizing the E-In line 196 and continuing braking action by feeding vehicle energy to the flywheel. Thus, at any particular vehicle speed, a slight braking action will cause valve 200 to institute an E-In cycle, i.e., E-In to flywheel from vehicle inertia, which increases the speed of the flywheel while reducing the speed of the vehicle.

Ordinarily, then as the vehicle slows, the flywheel angular velocity increases, and as the vehicle speed increases, the flywheel angular velocity decreases. Thus, the flywheel is always loaded for necessary acceleration and always ready to receive vehicular energy in the form of energy-in.

It will be appreciated that in present day vehicles the braking effect of the engine is not really significant at speeds around 20 miles per hour or less. In addition, the amount of energy which can be recaptured at such low speeds by regenerative braking is small. For these reasons, the regenerative braking function is interrupted at speeds below 20 miles per hour. When pressure in line 346 from line 210 (vehicle velocity) falls below that corresponding to a vehicle speed of 20 miles per hour, this reduced pressure on the left side of piston 214 allows spring 215 to move valve rods 230 and 294 to the left-hand position (two positions only, set by detent assembly 290). Full hydraulic pressure from line 164 will thus be applied through line 196, 184, 178 to valve 170 thus locking piston assemblies 72–82 or 102–104 allowing the vehicle engine to complete the energization of the flywheels at 100 percent efficiency. The mechanical link from rod 230 to switch 404 allows the vehicle clutch element 30 to be disengaged while this occurs. Simultaneous motion of valve rod 294 allows normal vehicle braking to occur, if required. Pressure in line 196 is also fed through line 188 to cylinder 190, opening the throttle so that engine power to energize the wheel is available. The degree of throttle opening actually realized depends also on pressure in the right end of cylinder 190, through line 195. The pressure in line 195 (related to the vehicle speed and flywheel angular velocity) will thus increase as the flywheel comes up to proportional speed, and the throttle opening will simultaneously decrease.

What is claimed as new as follows:

1. An apparatus for utilizing inertial energy in a vehicle having a prime mover, an accelerator, a brake system, and an output shaft which comprises:
   a. an inertial wheel on said vehicle,
   b. a multiple speed transmission means connecting said prime mover, said inertial wheel and said output shaft to direct rotative energy from said prime mover to said inertial wheel and said output shaft selectively, and from said output shaft to said inertial wheel, and from said inertial wheel to said output shaft, c. control means for said transmission responsive to the vehicle accelerator, the vehicle brake system, vehicle speed, vehicle acceleration, and inertial wheel angular velocity to maintain vehicle speed and inertial wheel angular velocity at a predetermined relation, and d. said transmission comprising:
1. a drive shaft driven selectively by said prime mover and said output shaft,
2. a first rotative assembly in driving relation to said inertial wheel,
3. a second rotative assembly to be driven by said drive shaft and said first rotative assembly selectively,
4. a first planetary gear set connecting said assemblies,
5. a first clutch to lock the sun gear of said planetary set,
6. a second clutch to lock said assemblies for mutual rotation,
7. a third clutch to connect said drive shaft and said second assembly for mutual rotation,
8. a third rotative assembly including an outer ring gear, a sun gear on said second assembly, and planetary gears to revolve with said drive shaft, and
9. a fourth clutch to limit rotation of said ring gear of said third rotative assembly.

2. An apparatus as defined in claim 1 in which said first planetary set comprises a sun gear, planetary gears mounted to revolve with said second rotative assembly and a ring gear on said first rotative assembly to drive and be driven by said inertial wheel.

3. An apparatus as defined in claim 2 in which said control means includes pressure actuated means for actuating said transmission and fluid pressure means responsive to the respective speeds of said flywheel and said output shaft for influencing said pressure actuated means.

4. An apparatus as defined in claim 3 in which said control means includes pressure control means responsive to change in vehicle speed.

5. An apparatus as defined in claim 3 in which said, control means includes a pressure responsive means influenced by accelerator position, brake position, and change in vehicle speed.

6. An apparatus for utilizing inertial energy in a vehicle having a prime mover, an accelerator, a brake system, and an output shaft which comprises:
a. an inertial wheel on said vehicle,
b. a multiple speed transmission means connecting said prime mover, said inertial wheel and said output shaft to direct rotative energy from said prime mover to said inertial wheel and said output shaft selectively, and from said output shaft to said inertial wheel, and from said inertial wheel to said output shaft,
c. control means for said transmission responsive to the vehicle accelerator, the vehicle brake system, vehicle speed, vehicle acceleration, and inertial wheel angular velocity to maintain vehicle speed and inertial wheel angular velocity at a predetermined relation,
d. vehicle braking being accomplished alternatively by a wheel brake system and introducing vehicle energy into said inertial wheel,
e. pressure responsive means to control said transmission,
f. a pressure source, and
g. valve means responsive to the combined speed of said vehicle and the angular speed of said inertial wheel to control said pressure responsive means to direct signal pressure to said transmission means or to said wheel brake system.

7. An apparatus for utilizing inertial energy in a vehicle having a prime mover, an accelerator, a brake system, and an output shaft which comprises:
a. an inertial wheel on said vehicle,
b. a multiple speed transmission means connecting said prime mover, said inertial wheel and said output shaft to direct rotative energy from said prime mover to said inertial wheel and said output shaft selectively, and from said output shaft to said inertial wheel, and from said inertial wheel to said output shaft,
c. control means for said transmission responsive to the vehicle accelerator, the vehicle brake system, vehicle speed, vehicle acceleration, and inertial wheel angular velocity to maintain vehicle speed and inertial wheel angular velocity at a predetermined relation, and
d. the control means for said transmission including:
1. accelerator linkage to transmit an accelerator signal to a prime mover,
2. a pressure responsive means independent of the vehicle operator connected to said linkage to enhance or decrease said signal,
3. means responsive to vehicle speed to influence said pressure responsive means in one direction, and
4. means responsive to vehicle acceleration to influence said pressure responsive means in the opposite direction.

8. An apparatus for utilizing inertial energy in a vehicle having a prime mover, an accelerator, a brake system, and an output shaft which comprises:
a. an inertial wheel on said vehicle,
b. a multiple speed transmission means connecting said prime mover, said inertial wheel and said output shaft to direct rotative energy from said prime mover to said inertial wheel and said output shaft selectively, and from said output shaft to an inertial wheel, and from said inertial wheel to said output shaft,
c. control means for said transmission responsive to the vehicle accelerator, the vehicle brake system, vehicle speed, vehicle acceleration, and inertial wheel angular velocity to maintain vehicle speed and interial wheel angular velocity at a predetermined relation,
d. the control menas for said transmission including:
1. accelerator linkage to transmit an accelerator signal to a prime mover,
2. a pressure responsive means independent of the vehicle operator connected to said linkage to enhance or decrease said signal,
3. means responsive to vehicle speed to influence said pressure responsive means in one direction, 4. means responsive to vehicle acceleration to influence said pressure responsive means in the opposite direction,
e. a flow control valve actuated by said pressure responsive means to direct pressure to a control means to cause energy to flow from said inertial wheel to said output shaft under conditions of low acceleration, and
f. said means responsive to vehicle acceleration comprising:
1. a second flow control valve to meter pressure to said pressure responsive means,
2. a pair of vehicle speed responsive pistons opposed to each other,
3. racks actuated by said pistons to mutually control said second flow control valve, and
4. a damper control on one of said pistons.

9. In an apparatus for utilizing inertial energy in a vehicle drive which includes a vehicle prime mover, an inertial wheel and an output shaft on said vehicle and transmission means to connect the prime mover to the output shaft and the inertial wheel to transmit energy, that improvement in a control means for governing said energy flow which comprises:
a. a variable speed ratio transmission having a plurality of speed ratios and a plurality of control elements for achieving the respective speed ratios,
b. a first means responsive to vehicle speed,
c. a second means responsive to inertial wheel angular velocity,
d. a third means responsive to the acceleration of the vehicle,
e. an accelerator lever for controlling the speed of the prime mover, and
f. a control circuit influenced by the position of said accelerator lever and interconnected with said first, second, and third means to transmit signals to said respective control elements of said transmission to maintain a predetermined relationship between vehicle speed and inertial wheel angular velocity wherein said inertial wheel is charged with kinetic energy at all times during motion of the vehicle.

10. An apparatus as defined in claim 9 in which said control circuit constitutes a fluid pressure system comprising a source of constant fluid pressure, said first means constitutes a second source of fluid pressure proportioned to vehicle speed, said second means constitutes an adjustable flow control valve controlled in its position by inertial wheel angular velocity, said third means comprises an adjustable flow control valve controlled in its position by acceleration of said vehicle, said control elements of said transmission are pressure responsive devices, and said control circuit interconnects said pressure sources and said devices through said valves to effect the control of energy flow to and from said inertial wheel.

11. In an apparatus for utilizing inertial energy in a vehicle drive which includes a vehicle prime mover, an inertial wheel and an output shaft on said vehicle and transmission means to connect the prime mover to the output shaft and the inertial wheel to transmit energy, that improvement in a control means for governing said energy flow which comprises:
a. a variable speed ratio transmission having a plurality of speed ratios and a plurality of control elements for achieving the respective speed ratios.
b. a first means responsive to vehicle speed,
c. a second means responsive to inertial wheel angular velocity,
d. a third means responsive to the acceleration of the vehicle,
e. an accelerator lever for controlling the speed of the prime mover,
f. a brake system for the vehicle including a brake pedal, and
g. a control circuit influenced by the respective position of said accelerator lever and said brake pedal and interconnected with said first, second, and third means to transmit signals to said respective control elements of said transmission to maintain a predetermined relationship between vehicle speed and inertial wheel angular velocity wherein said inertial wheel is charged with kinetic energy at all times during motion of the vehicle.

12. An apparatus as defined in claim 11 in which said control circuit includes means to effect transfer of vehicle energy to the inertial wheel in response to brake pedal actuation, and pressure responsive means responsive to vehicle speed to institute normal brake control of vehicle wheels below a predetermined minimum vehicle speed.

* * * * *